(12) United States Patent
Xu

(10) Patent No.: US 9,867,196 B2
(45) Date of Patent: Jan. 9, 2018

(54) METHOD FOR ESTABLISHING A RADIO CONNECTION, NETWORK APPARATUS AND TERMINAL APPARATUS

(71) Applicants: Beijing Lenovo Software Ltd., Haidian District, Beijing (CN); Lenovo (Beijing) Co., Ltd., Haidian District, Beijing (CN)

(72) Inventor: Qing Xu, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 54 days.

(21) Appl. No.: 14/855,795

(22) Filed: Sep. 16, 2015

(65) Prior Publication Data

US 2016/0366680 A1 Dec. 15, 2016

(30) Foreign Application Priority Data

Jun. 12, 2015 (CN) .......................... 2015 1 0325010

(51) Int. Cl.
*H04W 72/04* (2009.01)
*H04W 76/02* (2009.01)
*H04W 52/02* (2009.01)
*H04W 76/04* (2009.01)

(52) U.S. Cl.
CPC ..... *H04W 72/048* (2013.01); *H04W 52/0277* (2013.01); *H04W 76/02* (2013.01); *H04W 76/046* (2013.01); *Y02B 60/50* (2013.01)

(58) Field of Classification Search
CPC .. H04W 72/048; H04W 76/046; H04W 76/02
See application file for complete search history.

(56) References Cited

U.S. PATENT DOCUMENTS

| 2003/0022671 A1* | 1/2003 | Huomo | H04W 4/16 455/436 |
| 2008/0080412 A1* | 4/2008 | Cole | H04L 45/00 370/328 |
| 2013/0329637 A1* | 12/2013 | Kodali | H04W 76/046 370/328 |

(Continued)

*Primary Examiner* — Min Jung
(74) *Attorney, Agent, or Firm* — Brinks Gilson & Lione; G. Peter Nichols

(57) ABSTRACT

A method for establishing a radio connection between a network apparatus and a terminal apparatus, a network apparatus and a terminal apparatus are described. The method for establishing a radio connection, which is applied to a network apparatus, may include receiving a connection request for requesting a radio resource from a terminal apparatus, acquiring power supplying state information related to the terminal apparatus; setting a connection configuration instruction of the radio resource for connecting with the terminal apparatus based on the power supplying state information; and controlling a radio connection with the terminal apparatus based on the connection configuration instruction, the radio connection being used for data transmission between the network apparatus and the terminal apparatus. Accordingly, standby time of the terminal apparatus is prolonged while a network connection of the terminal apparatus can be maintained.

12 Claims, 4 Drawing Sheets

(56) References Cited

U.S. PATENT DOCUMENTS

| | | | | |
|---|---|---|---|---|
| 2014/0052774 A1* | 2/2014 | Pollack | ............ | H04W 52/0241 |
| | | | | 709/203 |
| 2014/0094127 A1* | 4/2014 | Dimou | ................. | H04W 4/005 |
| | | | | 455/67.11 |
| 2014/0213252 A1* | 7/2014 | Jung | ..................... | H04W 8/186 |
| | | | | 455/435.1 |
| 2014/0328209 A1* | 11/2014 | Lu | ....................... | H04W 72/048 |
| | | | | 370/254 |
| 2015/0263865 A1* | 9/2015 | Rangarajan | ......... | H04L 12/4633 |
| | | | | 370/254 |

* cited by examiner

METHOD FOR ESTABLISHING A RADIO CONNECTION, NETWORK APPARATUS AND TERMINAL APPARATUS

This application claims priority to Chinese patent application No. 201510325010.7 filed Jun. 12, 2015, the entire contents of which are incorporated herein by reference.

The present disclosure relates to a communication technical field, and more specifically, to a method for establishing a radio connection, a network apparatus and a terminal apparatus.

BACKGROUND

With development of electronic technology, a terminal apparatus is widely used. The terminal apparatus, for example, is a mobile phone, a laptop, a tablet computer, a personal digital assistant and so on. The terminal apparatus can assist users in work and life. In order to improve portability of the terminal apparatus, a battery is usually arranged in the terminal apparatus.

In current terminal apparatus, a large number of applications are installed to strengthen its functions, for example, users can communicate, play games and have social communications by means of the terminal apparatus. Power consumption of the terminal apparatus is correspondingly increased and standby time of the terminal apparatus is reduced. At present, one of bottlenecks in development of the terminal apparatus is the battery, and short standby time severely impacts user experience. Therefore, it is expected to take all kinds of measures to save the power consumption of the terminal apparatus, so as to improve the user experience.

SUMMARY

Embodiments of the present disclosure provide a method for establishing a radio connection between a network apparatus and a terminal apparatus, a network apparatus and a terminal apparatus, which can prolong standby time of the terminal apparatus as much as possible while maintaining a network connection of the terminal apparatus, so that user experience is improved.

In a first aspect, a method for establishing a radio connection is provided, which is applied to a network apparatus. The method may comprise: receiving a connection request for requesting a radio resource from a terminal apparatus; acquiring power supplying state information related to the terminal apparatus; setting a connection configuration instruction of the radio resource for connecting with the terminal apparatus based on the power supplying state information; and controlling a radio connection with the terminal apparatus based on the connection configuration instruction, the radio connection being used for data transmission between the network apparatus and the terminal apparatus.

In conjunction with the first aspect, in one implementation mode of the first aspect, the acquiring power supplying state information related to the terminal apparatus may include: receiving a reporting signaling from the terminal apparatus, the reporting signaling including apparatus capability information related to the terminal apparatus; and extracting power supplying state information related to the terminal apparatus from the reporting signaling.

In conjunction with the first aspect and the above implementation mode, in another implementation mode of the first aspect, the acquiring power supplying state information related to the terminal apparatus may include: acquiring at least one of a remaining battery power and a power supply connection state of the terminal apparatus as the power supplying state information.

In conjunction with the first aspect and the above implementation mode, in another implementation mode of the first aspect, the setting a connection configuration instruction of the radio resource for connecting with the terminal apparatus based on the power supplying state information may include: determining whether the terminal apparatus is powered by a battery or a charging supply based on the power supplying state information; determining whether the remaining battery power of the terminal apparatus is less than a first predetermined value based on the power supplying state information, in a case that the terminal apparatus is powered by the battery; and setting a connection configuration instruction of the radio resource in a mode of saving a power of the terminal apparatus when the remaining battery power is less than the first predetermined value.

In conjunction with the first aspect and the above implementation mode, in another implementation mode of the first aspect, the setting a connection configuration instruction of the radio resource in a mode of saving a power of the terminal apparatus may include: setting at least one of a disconnecting time and connection state information of the terminal apparatus in the mode of saving the power of the terminal apparatus.

In conjunction with the first aspect and the above implementation mode, in another implementation mode of the first aspect, the disconnecting time may be a predetermined time period from ending data transmission between the terminal apparatus and the network apparatus to disconnecting the radio connection; the connection state information may include a sleep time and a monitoring time of the terminal apparatus in a connection state between the terminal apparatus and the network apparatus; and the setting at least one of a disconnecting time and connection state information of the terminal apparatus in the mode of saving the power of the terminal apparatus includes at least one operation of: setting a connection configuration instruction of the radio resource to reduce the disconnecting time, and setting the connection configuration instruction of the radio resource to increase a ratio of the sleep time to the monitoring time of the terminal apparatus in the connection state.

In a second aspect, a method for establishing a radio connection is provided, which is applied to a terminal apparatus. The method may comprise: detecting power supplying state information of the terminal apparatus; transmitting the power supplying state information of the terminal apparatus to a network apparatus; sending a connection request for requesting a radio resource to the network apparatus; receiving a connection configuration instruction for indicating a connection mode between the network apparatus and the terminal apparatus from the network apparatus, the connection configuration instruction being sent by the network apparatus according to the power supplying state information; and establishing a radio connection with the network apparatus according to the connection configuration instruction, so as to carry out data transmission through the radio connection.

In conjunction with the second aspect, in one implementation mode of the second aspect, the transmitting the power supplying state information of the terminal apparatus to the network apparatus may include: encapsulating the power supplying state information of the terminal apparatus into a reporting signaling, the reporting signaling including apparatus capability information related to the terminal apparatus; and transmitting the reporting signaling to the network apparatus.

In conjunction with the second aspect and the above implementation mode, in another implementation mode of the second aspect, the transmitting the power supplying state information of the terminal apparatus to the network apparatus may include: determining whether the terminal apparatus is powered by a battery or a charging supply based on the power supplying state information; determining whether a remaining battery power of the terminal apparatus is less than a first predetermined value based on the power supplying state information, in a case that the terminal apparatus is powered by the battery; and transmitting the detected power supplying state information to the network apparatus when the remaining battery power is less than the first predetermined value.

In a third aspect, a network apparatus is provided. The network apparatus may comprise: a network end receiver, for receiving power supplying state information related to a terminal apparatus and receiving a connection request for requesting a radio resource from the terminal apparatus; a network end processor, for setting a connection configuration instruction of the radio resource for connecting with the terminal apparatus based on the power supplying state information; and a network end transmitter, for transmitting the connection configuration instruction to the terminal apparatus, to control a radio connection with the terminal apparatus, the radio connection being used for data transmission between the network apparatus and the terminal apparatus.

In conjunction with the third aspect, in one implementation mode of the third aspect, the network end receiver may receive a reporting signaling from the terminal apparatus, and extract power supplying state information related to the terminal apparatus from the reporting signaling. The reporting signaling includes apparatus capability information related to the terminal apparatus, and the apparatus capability information includes power supplying state information related to the terminal apparatus.

In conjunction with the third aspect and the above implementation mode, in another implementation mode of the third aspect, the network end receiver may receive at least one of a remaining battery power and a power supply connection state of the terminal apparatus as the power supplying state information.

In conjunction with the third aspect and the above implementation mode, in another implementation mode of the third aspect, the network end processor may set the connection configuration instruction through operations of: determining whether the terminal apparatus is powered by a battery or a charging supply based on the power supplying state information; determining whether a remaining battery power of the terminal apparatus is less than a first predetermined value based on the power supplying state information in a case that the terminal apparatus is powered by the battery; and setting a connection configuration instruction of the radio resource in a mode of saving a power of the terminal apparatus when the remaining battery power is less than the first predetermined value.

In conjunction with the third aspect and the above implementation mode, in another implementation mode of the third aspect, the network end processor may set at least one of a disconnecting time and connection state information of the terminal apparatus in the mode of saving the power of the terminal apparatus.

In conjunction with the third aspect and the above implementation mode, in another implementation mode of the third aspect, the disconnecting time may be a predetermined time period from ending data transmission between the terminal apparatus and the network apparatus to disconnecting the radio connection; the connection state information may include a sleep time and a monitoring time of the terminal apparatus in a connection state between the terminal apparatus and the network apparatus; and the network end processor may set a connection configuration instruction of the radio resource to reduce the disconnecting time, or set the connection configuration instruction of the radio resource to increase a ratio of the sleep time to the monitoring time of the terminal apparatus in the connection state, thus saving power consumption of the terminal apparatus.

In a fourth aspect, a terminal apparatus is provided. The terminal apparatus may comprise: a detector, for detecting power supplying state information of the terminal apparatus; a terminal transmitter, for transmitting the power supplying state information of the terminal apparatus to a network apparatus, and sending a connection request for requesting a radio resource to the network apparatus; a terminal receiver, for receiving a connection configuration instruction for indicating a connection mode between the network apparatus and the terminal apparatus from the network apparatus, the connection configuration instruction being sent by the network apparatus according to the power supplying state information; and a terminal processor, for establishing a radio connection with the network apparatus according to the connection configuration instruction, so as to carry out data transmission through the radio connection.

In conjunction with the fourth aspect, in one implementation mode of the fourth aspect, the terminal transmitter may encapsulate the power supplying state information of the terminal apparatus into a reporting signaling, and transmit the reporting signaling to the network apparatus, the reporting signaling including apparatus capability information related to the terminal apparatus.

In conjunction with the fourth aspect and the above implementation mode, in another implementation mode of the fourth aspect, the terminal processor may further determine whether the terminal apparatus is powered by a battery or a charging supply based on the power supplying state information detected by the detector, and determine whether a remaining battery power of the terminal apparatus is less than a first predetermined value based on the power supplying state information in a case that the terminal apparatus is powered by the battery; and instruct the terminal transmitter to transmit the detected power supplying state information when the remaining battery power is less than the first predetermined value.

In technical solutions of a method for establishing a radio connection between a network apparatus and a terminal apparatus, a network apparatus and a terminal apparatus according to the embodiments of the present disclosure, the connection configuration instruction of the radio resource between the network apparatus and the terminal apparatus is set based on the power supplying state information of the terminal apparatus, and the radio connection is established according to the connection configuration instruction, and thus standby time of the terminal apparatus can be prolonged as much as possible while the network connection of the terminal apparatus is maintained, so that user experience is improved.

BRIEF DESCRIPTION OF THE DRAWINGS

In order to clearly illustrate the technical solution of the embodiments of the present disclosure, a brief introduction of the drawings required for description of the embodiments or the prior art shall be given hereinafter, and apparently, the drawings described as follows are only some embodiments of the present disclosure, but for those of ordinary skill in the art, other drawings can also be obtained according to these drawings.

DETAILED DESCRIPTION

Hereinafter, the technical solutions of the embodiments of the present disclosure will be described in a clearly and fully understandable way in connection with the drawings in the embodiments of the present disclosure. It is obvious that the described embodiments are just a part but not all of the embodiments of the present disclosure.

Figure 1:
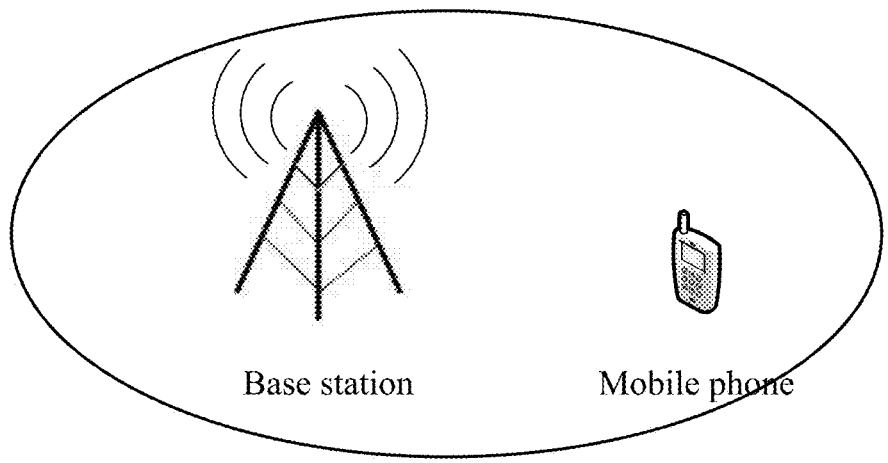
FIG. 1 schematically illustrates an application scenario according to an embodiment of the present disclosure.

FIG. 1 schematically illustrates an application scenario according to an embodiment of the present disclosure. As shown in FIG. 1, when a mobile phone comes into coverage of a base station, the mobile phone requests the base station to allocate a radio resource thereto, so as to establish a communicative connection with the base station, and carry out data transmission, voice communication and so on through the base station. The mobile phone is a terminal apparatus, and the base station is a network apparatus.

Generally, the network apparatus sends a broadcast signal according to a certain rule. The terminal apparatus which came into the coverage of the network apparatus can receive the broadcast signal, and acquire information of the network apparatus such as signal strength, frequency and so on according to the broadcast signal. Then, the terminal apparatus sends an access request to the network apparatus. The access request is used for requesting the network apparatus to allocate a radio resource thereto.

The network apparatus allocates the radio resource to the terminal apparatus after receiving the connection request. The radio resource, for example, is a radio resource block for transmitting data between the network apparatus and the terminal apparatus. The radio resource block is typically represented by one or more of frequency, time and code. Thereafter, the network apparatus performs a radio resource control (RRC) to control a connection state with the terminal apparatus. For example, in an LTE communication network, the base station optimizes the radio resource control, to control the terminal apparatus to only have two states of RRC idle (RRC_IDLE) and RRC connection (RRC_CONNECTED).

In the RRC idle state, there is no actual data transmission, and the terminal apparatus can only be paged for data transmission of a downlink from the network apparatus to the base station apparatus. Accordingly, the terminal apparatus occupies less radio resources, and consumes less power. For example, the terminal apparatus has a standby current of about 5 mA in the RRC idle state. When the terminal apparatus requires, a RRC connection request can be initiated to perform uplink data transmission, and the terminal apparatus turns into a RRC connection state.

In the RRC connection state, if the terminal apparatus and the network apparatus maintain a state of continuous data transmission, the terminal apparatus needs to consume a lot of energy, because a RF module in the terminal apparatus needs to be in an ON state all the time. Accordingly, the terminal apparatus occupies more radio resources, and consumes more power. For example, the terminal apparatus has a current of about 300 mA when maintaining the state of continuous data transmission. In the RRC connection state, the terminal apparatus and the network apparatus can maintain a state of discontinuous data transmission, that is, a connection time between the terminal apparatus and the network apparatus is divided into a sleep period and a monitoring period. In the monitoring period, the terminal apparatus and the network apparatus can transmit data to each other, but in the sleep period, the terminal apparatus cannot transmit data to the network apparatus. Therefore, the RF module of the terminal apparatus only keeps open state during the monitoring period, but is in non-use state in the sleep period, so power consumption of the terminal apparatus can be saved. For example, the terminal apparatus has a current of about 100 mA when maintaining the state of discontinuous data transmission, and the current may change with a length of the sleep period and a length of the monitoring period. This disclosure is intended to control the connection state between the network apparatus and the terminal apparatus to reduce power consumption of the terminal apparatus.

The terminal apparatus in the embodiments of the present disclosure is typically a mobile phone, a tablet computer and a laptop, etc., and may also be a portable, pocket type, hand-held, computer built-in or vehicle mounted mobile device. The type of terminal apparatus does not constitute a limitation to the embodiments of the present disclosure. The communication network where the network apparatus is located in the embodiments of the present disclosure, may adopt various communication technologies, including but not limited to Global System for Mobile Communications (GSM), Code Division Multiple Access (CDMA), Wideband Code Division Multiple Access (WCDMA), Time Division Synchronous Code Division Multiple Access (TD-SCDMA), Long-term Evolution (LTE), Wireless Local Area Network (WLAN), 5G, and 6G, etc. The network apparatus is typically a base station in these communication networks. The network apparatus may also be any apparatus for managing the terminal apparatus to access the communication network. The type of communication network does not constitute a limitation to the embodiments of the present disclosure. Hereinafter, an example that the network apparatus is a base station and the terminal apparatus is a mobile phone is taken for description.

Figure 2:
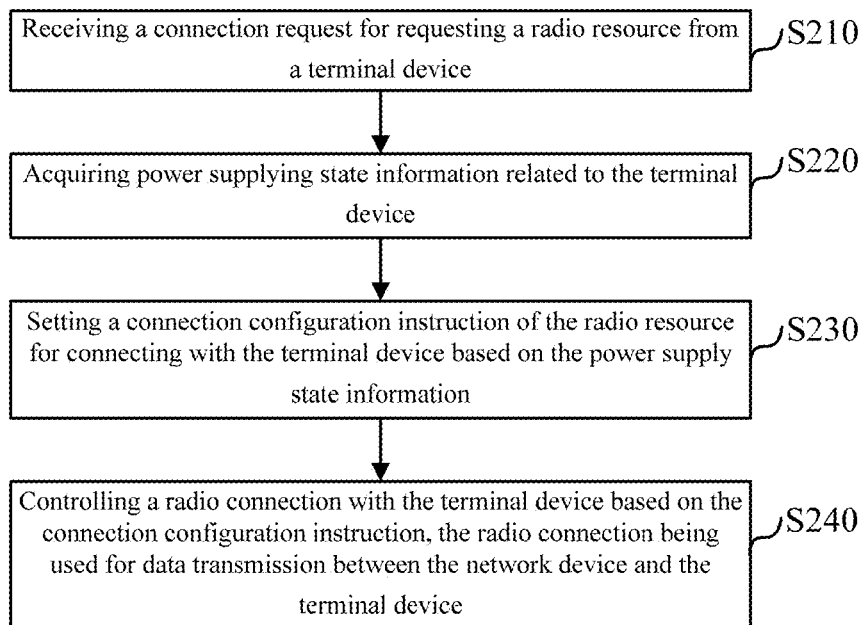
FIG. 2 schematically illustrates a flow chart of a method for establishing a radio connection, which is applied to a network apparatus, according to an embodiment of the present disclosure.

FIG. 2 schematically illustrates a flow chart of a method 200 for establishing a radio connection, which is applied to a network apparatus, according to an embodiment of the present disclosure. The method 200 for establishing a radio connection can be applied to a base station shown in FIG. 1, i.e., applied to a network apparatus.

As shown in FIG. 1, the method 200 for establishing a radio connection may comprise: receiving a connection request for requesting a radio resource from a terminal apparatus (S210); acquiring power supplying state information related to the terminal apparatus (S220); setting a connection configuration instruction of the radio resource for connecting with the terminal apparatus based on the power supplying state information (S230); and controlling a radio connection with the terminal apparatus based on the connection configuration instruction, the radio connection being used for data transmission between the network apparatus and the terminal apparatus (S240).

In S210, the network apparatus receives a connection request for requesting a radio resource from a terminal apparatus. For example, in an LTE communication network, when a terminal apparatus in a RRC idle state needs to communicate with the network apparatus to transmit data, the terminal apparatus sends a connection request to the network apparatus. The network apparatus performs a radio resource control after receiving the connection request. In other communication networks, after the terminal apparatus accesses the base station, the base station usually performs a radio resource management on the terminal apparatus according to the connection request of the terminal apparatus too, to improve service efficiency of the radio resource, which is not described in details here.

The network apparatus usually allocates the radio resource to the terminal apparatus according to a predetermined rule without considering changes in state of the terminal apparatus itself, after receiving a connection request for requesting a radio resource from the terminal apparatus. Under the predetermined rule, if the network apparatus allocates more radio resources to the terminal apparatus, communication speed between the network apparatus and terminal apparatus can be increased, and delay is reduced, but the terminal apparatus consumes more energy; if the network apparatus allocates less radio resources to the terminal apparatus, although quality of communication between the network apparatus and terminal apparatus may be lowered to some degree, power consumption of the terminal apparatus is reduced. For example, in a case that the terminal apparatus is in low power, if the network apparatus controls a state of continuous data transmission with the terminal apparatus, power of the terminal apparatus will be exhausted soon, thus forcing data communication of the terminal apparatus to be ended. In this way, user experience of the terminal apparatus is greatly reduced. In the embodiments of the present disclosure, stand-by time of the terminal apparatus can be prolonged as much as possible while a network connection of the terminal apparatus can be maintained through steps as follows, so that user experience is improved.

In S220, power supplying state information related to the terminal apparatus is acquired. The power supplying state information may be a remaining battery power of the terminal apparatus, may also be a power supply connection state of the terminal apparatus, or may include both of the remaining battery power and the power supply connection state. The power connection state, for example, refers to whether the terminal apparatus is powered by a battery or a charging supply. Correspondingly, in S220, the network apparatus can acquire at least one of the remaining battery power and the power supply connection state of the terminal apparatus as the power supplying state information.

The network apparatus can directly receive the power supplying state information from the terminal apparatus. Specifically, the network apparatus can acquire the power supplying state information through operations of: receiving a reporting signaling from the terminal apparatus, the reporting signaling including apparatus capability information related to the terminal apparatus, and extracting the power supplying state information related to the terminal apparatus from the reporting signaling. Generally, different terminal apparatus may have different capabilities, for example, level of modulation mode supported by the terminal apparatus, or data block processing capability and so on. These capabilities are fixed with specific terminal apparatus, which will not change with time and environment. The network apparatus can perform a radio resource control according to capability of the terminal apparatus. Therefore, the power supplying state information of the terminal apparatus can be reported to the network apparatus by expanding an existing reporting signaling of the terminal apparatus, which does not change an existing communication mechanism, so that good compatibility is maintained.

In addition, the network apparatus may further acquire the power supplying state information of the terminal apparatus from a server for managing state information of the terminal apparatus. For example, in an intelligent control system, various state information of respective terminal apparatuses in the intelligent control system are acquired by a special server, that is, the respective terminal apparatuses in the intelligent control system report the state information thereof to the special server, including the power supplying state information thereof. Correspondingly, the network apparatus can receive the power supplying state information of the terminal apparatus from the special server. Or the terminal apparatus can install a special process or application, to send the power supplying state information to a server of an operator through available data channels at right time, and then the server of the operator synchronizes the power supplying state information with a base station where the terminal apparatus is located. In this case, it is not necessary to expand an air interactive signaling between the terminal apparatus and the base station, i.e., the reporting signaling.

In S230, a connection configuration instruction of the radio resource for connecting with the terminal apparatus is set based on the power supplying state information. That is to say, when the network apparatus performs a radio resource control on the terminal apparatus, the power supplying state information of the terminal apparatus itself is further considered. The power supplying state information is information changing with time and environment for the terminal apparatus. For example, when power supplying quantity of the terminal apparatus is sufficient, the network apparatus can set a connection configuration instruction of the radio resource, to make the terminal apparatus maintain good communication quality; when the power supplying quantity of the terminal apparatus is less than a predetermined value, the network apparatus can set a connection configuration instruction of the radio resource, to save power consumption as far as possible in a case of ensuring data transmission of the terminal apparatus.

Figure 3:
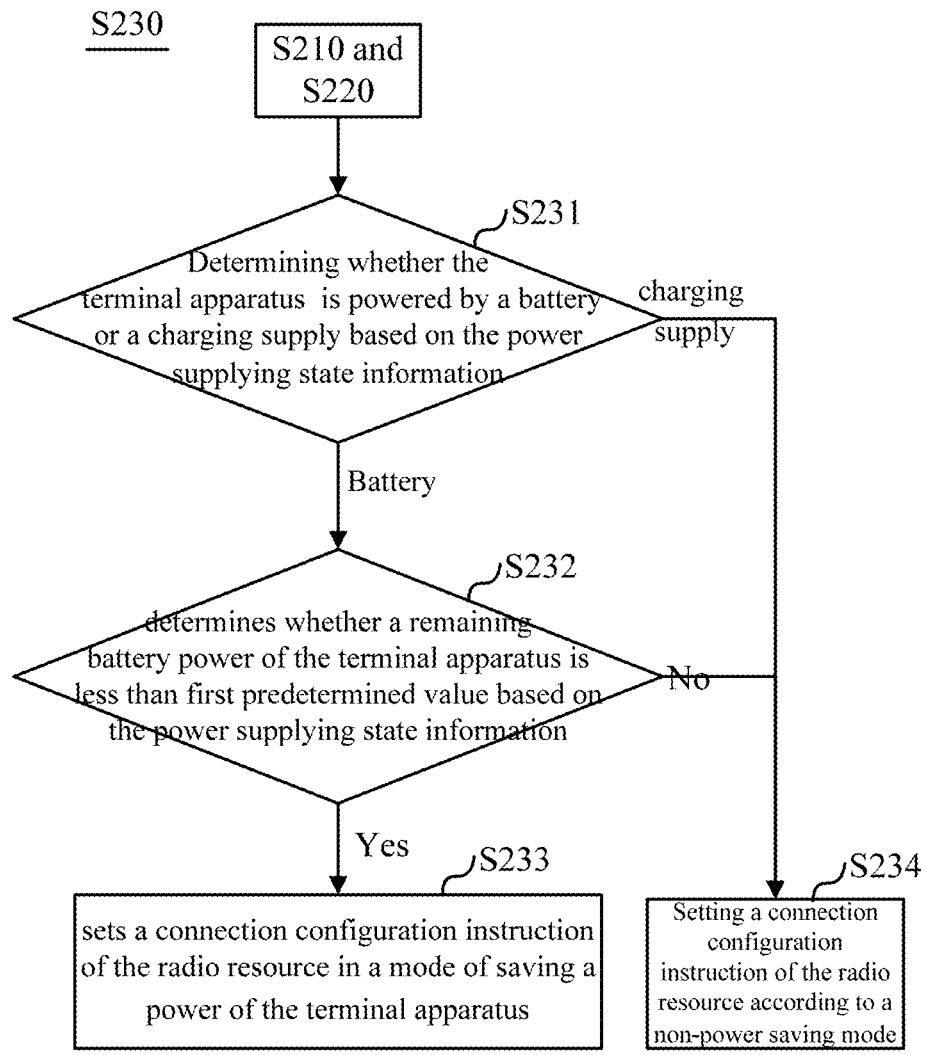
FIG. 3 schematically illustrates a flow chart of setting a connection configuration instruction in the method for establishing the radio connection of FIG. 2.

FIG. 3 schematically illustrates a flow chart of setting a connection configuration instruction in S230 in the method for establishing the radio connection of FIG. 2.

As shown in FIG. 3, the terminal apparatus determines whether the terminal apparatus is powered by a battery or a charging supply based on the power supplying state information after receiving the connection request and the power supplying state information (S231); determines whether a remaining battery power of the terminal apparatus is less than a first predetermined value based on the power supplying state information in a case that the terminal apparatus is powered by the battery (S232); and sets a connection configuration instruction of the radio resource in a mode of saving a power of the terminal apparatus when the remaining battery power is less than the first predetermined value (S233). In addition, when it is determined that the terminal apparatus is powered by the charging supply in S231, or it is determined that the remaining battery power of the terminal apparatus is not less than the first predetermined value in S232, a connection configuration instruction of the radio resource is set according to a non-power saving mode (S234).

In S231, in a case that a mobile phone is powered by the charging supply, it has adequate power supplying, and it is not necessary to consider the standby time, so the base station can set a connection configuration instruction of the radio resource connected with the mobile phone according to a predetermined mode. Here, the mobile phone is powered by the charging supply, which merely is a typical representation of having adequate power supplying. When the mobile phone is powered by a continuous power supply, it can be also considered that the mobile phone has adequate power supplying, and then the setting the connection configuration instruction of the radio resource according to a non-power saving mode in S234 can be performed.

In S232, it is determined whether the remaining battery power of the terminal apparatus is less than a first predetermined value based on the power supplying state information of the terminal apparatus. The first predetermined value may be, for example, remained 15% of battery capacity of a mobile phone, or remained 20% of battery capacity of a tablet computer. The first predetermined value may be varied with total standby time of the terminal apparatus in the battery power supplying. When the remaining battery power of the mobile phone is less than the first predetermined value, it shows that the remaining power of the battery is very low, and it is necessary to save power, to prolong its service time. Otherwise, the process enters S234.

In S233, at least one of a disconnecting time and connection state information of the terminal apparatus can be set in a mode of saving a power of the terminal apparatus. The disconnecting time, for example, is a predetermined time period from ending data transmission between the terminal apparatus and the network apparatus to disconnecting the radio connection. Taking an LTE communication network for example, in an RRC connection state, the terminal apparatus and the network apparatus can transmit data; after data transmission between the two is completed, the terminal apparatus usually enters an RRC idle state within a predetermined time period, to disconnect a radio connection between the terminal apparatus and the network apparatus. By reducing the predetermined time period, power of the terminal apparatus can be saved.

The connection state information, for example, may include a sleep time and a monitoring time of the terminal apparatus in a connection state between the terminal apparatus and the network apparatus. To further taking the LTE communication network for example, in the RRC connection state, in order to save resources, the network apparatus can control the terminal apparatus to keep a state of discontinuous data transmission. The state of discontinuous data transmission, for example, is a Discontinuous Reception (DRX) mode, and a connection time between the terminal apparatus and network apparatus is divided into a sleep period and a monitoring period; in the monitoring period, the terminal apparatus and the network apparatus can transmit data to each other, but in the sleep period, the terminal apparatus cannot transmit data to the network apparatus, so that power consumption is reduced. Therefore, by increasing a ratio of the sleep time to the monitoring time of the terminal apparatus in the connection state, power of the terminal apparatus can be saved. The connection state information, for example, may further include a ratio of the monitoring time of the terminal apparatus to the sleep time of the terminal apparatus in the connection state between the terminal apparatus and the network apparatus, or a ratio of the monitoring time to total connection time and so on.

In a process of setting at least one of a disconnecting time and connection state information of the terminal apparatus in the mode of saving the power of the terminal apparatus, a connection configuration instruction of the radio resource can be set to reduce the disconnecting time; or, the connection configuration instruction of the radio resource can be set to increase the ratio of the sleep time to the monitoring time of the terminal apparatus in the connection state. Taking a DRX mode in an LTE communication network for example, the network apparatus usually sets a connection configuration instruction in a "RRC connection configuration" or a "RRC connection setting", the "RRC connection configuration" or the "RRC connection setting" can include parameters of: "DRX-inactivity timer", "onDurationTimer", "DRX-Retransmission timer", "HARQ RTTTimer", "short-DRX-Cycle", "drxShortCycleTimer", "longDRX-Cycle", etc. By properly setting these parameters in the "RRC connection configuration" or the "RRC connection setting", at least one of the reducing the disconnecting time and the increasing the ratio of the sleep time to the monitoring time in the connection state can be performed.

In S240, a radio connection with the terminal apparatus is controlled based on the connection configuration instruction. That is to say, the network apparatus transmits the connection configuration instruction to the terminal apparatus, and the terminal apparatus sets a radio connection there between based on the connection configuration instruction, to communicate with the terminal apparatus.

In the technical solution of a method for establishing a radio connection between a network apparatus and a terminal apparatus according to the embodiment of the present disclosure, the network apparatus sets a connection configuration instruction of the radio resource between the terminal apparatus and the network apparatus based on the power supplying state information of the terminal apparatus, and establishes a radio connection based on the connection configuration instruction, which can prolong standby time of the terminal apparatus as much as possible while maintaining a network connection of the terminal apparatus, so that user experience is improved.

Figure 4:
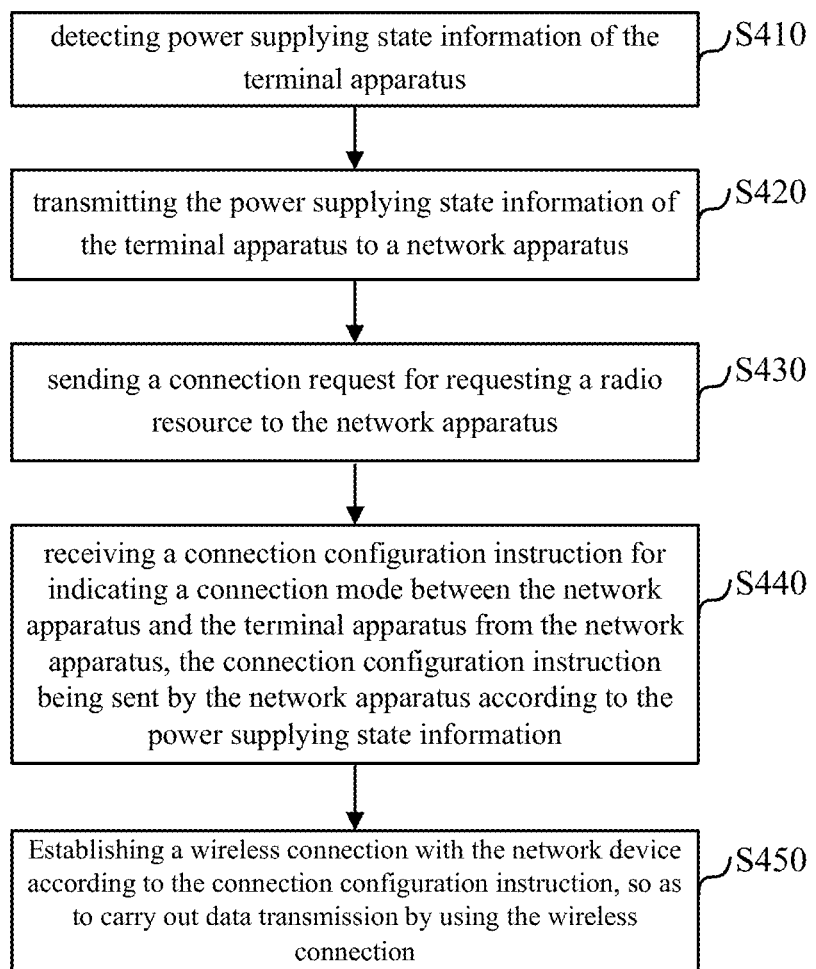
FIG. 4 schematically illustrates a flow chart of a method for establishing a radio connection, which is applied to a terminal apparatus, according to an embodiment of the present disclosure.

FIG. 4 schematically illustrates a flow chart of a method 400 for establishing a radio connection, which is applied to a terminal apparatus, according to an embodiment of the present disclosure. The method 400 for establishing a radio connection can be applied to a mobile phone shown in FIG. 1, i.e., applied to a terminal apparatus.

As shown in FIG. 4, the method 400 for establishing a radio connection may comprise: detecting power supplying state information of the terminal apparatus (S410); transmitting the power supplying state information of the terminal apparatus to a network apparatus (S420); sending a connection request for requesting a radio resource to the network apparatus (S430); receiving a connection configuration instruction for indicating a connection mode between the network apparatus and the terminal apparatus from the network apparatus, the connection configuration instruction being sent by the network apparatus according to the power supplying state information (S440); and establishing a radio connection with the network apparatus according to the connection configuration instruction, so as to carry out data transmission through the radio connection (S450).

In S410, for example, the power supplying state information of the terminal apparatus can be acquired by a power management module of the terminal apparatus. In the terminal apparatus, the power management module is usually used in cooperation with a battery, and the power management module can record information such as source of power supply of the terminal apparatus, battery capacity and so on. Therefore, in S410, the power supplying state information of the terminal apparatus can be acquired by communicating with the power management module.

In S420, the power supplying state information of the terminal apparatus is transmitted to the network apparatus. The power supplying state information may be a remaining battery power of the terminal apparatus, may also be a power supply connection state of the terminal apparatus, or may include both of the remaining battery power and the power supply connection state. The power supply connection state, for example, refers to whether the terminal apparatus is powered by a battery or a charging supply.

In step S420, the power supplying state information can be transmitted to the network apparatus when the power supplying state information meets predetermined conditions. That is to say, not all the power supplying state information is transmitted to the network apparatus, but the power supplying state information is filtered. For example, the power supplying state information is transmitted to the network apparatus when the terminal apparatus needs to save power.

As an example, in S420, it is determined whether the terminal apparatus is powered by a battery or a charging supply based on the power supplying state information; in a case that the terminal apparatus is powered by the battery, it is determined whether a remaining battery power of the terminal apparatus is less than a first predetermined value based on the power supplying state information; and the detected power supplying state information is transmitted to the network apparatus when the remaining battery power is less than the first predetermined value. At this moment, the power supplying state information may simply be a low power indicator, and the network apparatus sets a connection configuration instruction of the radio resource in a mode of saving a power of the terminal apparatus in S230 after receiving the low power indicator. Correspondingly, the network apparatus may not perform respective steps S231 and S232 described in conjunction with FIG. 3. Here, it is the terminal apparatus rather than the network apparatus that determines whether it is necessary to set a connection configuration instruction of the radio resource in the mode of saving the power of the terminal apparatus, which not only reduces load of the network apparatus, but also reduces an information transmission amount from the terminal apparatus to the network apparatus.

The terminal apparatus can directly transmit the power supplying state information to the network terminal. For example, the terminal apparatus can transmit the power supplying state information through operations of: packaging the power supplying state information of the terminal apparatus into a reporting signaling, the reporting signaling including apparatus capability information related to the terminal apparatus; and transmitting the reporting signaling to the network apparatus. As described above, the power supplying state information of the terminal apparatus is reported to the network apparatus by expanding an existing reporting signaling of the terminal apparatus, which does not change an existing communication mechanism, so that good compatibility is maintained.

In addition, the power supplying state information can also be transmitted to a server by the terminal apparatus, and then transmitted to the network apparatus by the server. The server, for example, is a special server in an intelligent control system, or a server of an operator, etc. In this case, it is not necessary to expand an air interactive signaling between the terminal apparatus and the base station, i.e., the reporting signaling. A specific transmitting mode of power supplying state information does not constitute a limitation to the embodiments of the present disclosure.

In S430, the terminal apparatus sends a connection request for requesting a radio resource to the network apparatus. For example, in an LTE communication network, when a terminal apparatus in an RRC idle state needs to communicate with the network apparatus to transmit data, the terminal apparatus sends a connection request to the network apparatus. In FIG. 4, it shows that S430 is performed after S420, which is just an example. In fact, S430 can also be performed at the same time with S420 or before S420.

As described above, the network apparatus sets a connection configuration instruction of the radio resource for connecting with the terminal apparatus based on the power supplying state information after receiving the connection request (S230), and controls a radio connection with the terminal apparatus based on the connection configuration instruction (S240).

Corresponding to the S240, the terminal apparatus receives a connection configuration instruction for indicating a connection mode between the network apparatus and the terminal apparatus from the network apparatus in S440, and the connection configuration instruction is sent by the network apparatus according to the power supplying state information. Taking a DRX mode in an LTE communication network for example, the connection configuration instruction, for example, may include one or more of parameters as follows: "DRX-inactivity timer", "onDurationTimer", "DRX-Retransmission timer", "HARQ RTTTimer", "shortDRX-Cycle", "drxShortCycleTimer", "longDRX-Cycle", etc. The parameters can make at least one of a disconnecting time and connection state information of the terminal apparatus be set in a mode of saving a power of the terminal apparatus. The disconnecting time, for example, is a predetermined time period from ending data transmission between the terminal apparatus and the network apparatus to disconnecting the radio connection. The connection state information, for example, may include a sleep time and a monitoring time of the terminal apparatus in a connection state between the terminal apparatus and the network apparatus.

In S450, a radio connection is established with the network apparatus according to the connection configuration instruction. For example, the terminal apparatus can establish a radio connection with the network apparatus according to the parameter setting in the DRX mode described above, so as to communicate with the network apparatus in a mode of saving power of the terminal apparatus, or in a non-power saving mode.

In the technical solution of a method for establishing a radio connection between a network apparatus and a terminal apparatus according to the embodiment of the present disclosure, the terminal apparatus transmits power supplying state information to the network apparatus, and communicates with the network apparatus according to a connection configuration instruction which is set based on the power supplying state information, which can prolong standby time of the terminal apparatus as much as possible while maintaining a network connection of the terminal apparatus, so that user experience is improved.

Figure 5:
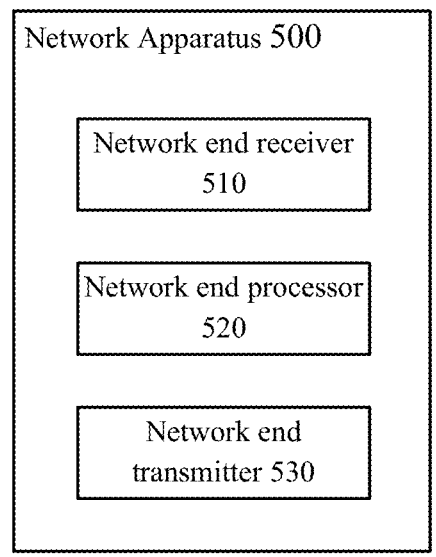
FIG. 5 schematically illustrates a block diagram of a network apparatus according to an embodiment of the present disclosure.

FIG. 5 schematically illustrates a block diagram of a network apparatus 500 according to the embodiment of the present disclosure. The network apparatus, for example, is a base station in FIG. 1.

As shown in FIG. 5, the network apparatus 500 may comprise: a network end receiver 510, for receiving power supplying state information related to a terminal apparatus and receiving a connection request for requesting a radio resource from the terminal apparatus; a network end processor 520, for setting a connection configuration instruction of the radio resource for connecting with the terminal apparatus based on the power supplying state information; and a network end transmitter 530, for transmitting the connection configuration instruction to the terminal apparatus, to control a radio connection with the terminal apparatus, the radio connection being used for data transmission between the network apparatus and the terminal apparatus.

The network end receiver 510 is typically a receiver of a radio frequency signal, for example, may include an antenna, a decoder and so on. For example, when a terminal apparatus in an RRC idle state needs to communicate with a network apparatus to transmit data, the terminal apparatus sends a connection request to the network apparatus, which is received by the network end receiver 510. In addition, the network end receiver 510 also receives power supplying state information related to the terminal apparatus. The power supplying state information may be at least one of a remaining battery power and a power supply connection state of the terminal apparatus.

The network end receiver 510 can directly receive the power supplying state information of the terminal apparatus from the terminal apparatus. Specifically, the network end receiver 510 can receive a reporting signaling from the terminal apparatus, the reporting signaling including apparatus capability information related to the terminal apparatus, and the apparatus capability information including power supplying state information related to the terminal apparatus. Then, the network end receiver 510 extracts power supplying state information related to the terminal apparatus from the reporting signaling. The network end receiver 510 can include a special chip for processing the reporting signaling such as un-packaging, to acquire the power state information related to the terminal apparatus therefrom. Generally, different terminal apparatuses may have different capabilities, for example, level of modulation mode supported by the terminal apparatus, or data block processing capability and so on. These capabilities are fixed with specific terminal apparatus, which will not change with time and environment. The network apparatus can perform a radio resource control according to capability of the terminal apparatus. Therefore, the power supplying state information of the terminal apparatus can be reported to the network apparatus by expanding an existing reporting signaling of the terminal apparatus, which does not change an existing communication mechanism, so that good compatibility is maintained.

In addition, the network end receiver 510 may further acquire the power supplying state information of the terminal apparatus from a server for managing state information of the terminal apparatus. The server, for example, is a special server in an intelligent control system, or a server of an operator. The server can collect the power supplying state information of the terminal apparatus, and transmit the same to the network end receiver 510. In this case, it is not necessary to expand an air interactive signaling between the terminal apparatus and the base station, i.e., the reporting signaling.

After receiving the connection request, the network end processor 520 sets a connection configuration instruction of the radio resource for connecting with the terminal apparatus based on the power supplying state information received by the network end receiver 510. The power supplying state information is information changing with time and environment for the terminal apparatus. For example, when power supplying quantity of the terminal apparatus is sufficient, the network end processor 520 can set a connection configuration of the radio resource, to make the terminal apparatus maintain good communication quality; when the power supplying quantity of the terminal apparatus is lower than a predetermined value, the network end processor 520 can set a connection configuration instruction of the radio resource, to save power consumption as far as possible in a case of ensuring data transmission of the terminal apparatus.

The network end processor 520 can set the connection configuration instruction through operations of: determining whether the terminal apparatus is powered by a battery or a charging supply based on the power supplying state information; determining whether a remaining battery power of the terminal apparatus is less than a first predetermined value based on the power supplying state information in a case that the terminal apparatus is powered by the battery; and setting a connection configuration instruction of the radio resource in a mode of saving a power of the terminal apparatus when the remaining battery power is less than the first predetermined value. In addition, when the terminal apparatus is powered by the charging supply, or the remaining battery power of the terminal apparatus is not less than the first predetermined value, the network end processor 520 can set a connection configuration instruction of the radio resource according to a non-power saving mode. The first predetermined value, for example, is remained 15% of battery capacity of a mobile phone, or remained 20% of battery capacity of a tablet computer. The first predetermined value may be varied with total standby time of the terminal apparatus in the battery power supplying.

In a case that a mobile phone is powered by the charging supply, it has adequate power supplying, and it is not necessary to consider the standby time, so a base station can set a connection configuration instruction of the radio resource connected with the mobile phone according to a predetermined mode. In addition, when the mobile phone is powered by a continuous power supply, it can also be considered that the mobile phone has adequate power supplying. When the remaining battery power of the mobile phone is greater than the first predetermined value, it indicates that the mobile phone has adequate power supplying. When the remaining battery power of the mobile phone is less than the first predetermined value, it shows that the remaining quantity of the battery is very low, and it is necessary to save power, to prolong its service time. Therefore, the network end processor 520 can set the connection configuration instruction of the radio resource according to the mode of saving power.

When the remaining battery power of the mobile phone is less than the first predetermined value, the network end processor 520 sets at least one of a disconnecting time and connection state information of the terminal apparatus in the mode of saving the power of the terminal apparatus. The disconnecting time, for example, is a predetermined time period from ending data transmission between the terminal apparatus and the network apparatus to disconnecting the radio connection. By reducing the predetermined time period, power of the terminal apparatus can be saved.

The connection state information, for example, may include a sleep time and a monitoring time of the terminal apparatus in a connection state between the terminal apparatus and the network apparatus. Taking a DRX mode in an LTE communication network for example, a connecting time between the terminal apparatus and the network apparatus is divided into a sleep period and a monitoring period. In the monitoring period, the terminal apparatus and the network apparatus can transmit data to each other, but power consumption of the terminal apparatus is relatively large. In the sleep period, the terminal apparatus cannot transmit data to the network apparatus, so power consumption of the terminal apparatus becomes lower. Therefore, by increasing a ratio of the sleep time to the monitoring time of the terminal apparatus in the connection state, power of the terminal apparatus can be saved. The connection state information may further include a ratio of the monitoring time to the sleep time of the terminal apparatus in the connection state between the terminal apparatus and the network apparatus, or a ratio of the monitoring time to total connection time and so on.

In a process of setting at least one of a disconnecting time and connection state information of the terminal apparatus in the mode of saving the power of the terminal apparatus, the network end processor 520 can set a connection configuration instruction of the radio resource to reduce the disconnecting time; or, set the connection configuration instruction of the radio resource to increase the ratio of the sleep time to the monitoring time of the terminal apparatus in the connection state. Taking a DRX mode in an LTE communication network for example, the network apparatus usually sets the connection configuration instruction in a "RRC connection setting", which may include parameters of: "DRX-inactivity timer", "onDurationTimer", "DRX-Retransmission timer", "HARQ RTTTimer", "shortDRX-Cycle", "drxShortCycleTimer", "longDRX-Cycle", etc. By properly setting these parameters in the "RRC connection setting", at least one of the reducing the disconnecting time and the increasing the ratio of the sleep time to the monitoring time in the connection state can be performed.

The network end processor 520 may be a general-purpose processor, a Digital Signal Processor (DSP), an Application-Specific Integrated Circuit (ASIC), a Field-Programmable Gate Array (FPGA) or other programmable logic devices, discrete gates or transistor logic devices, and discrete hardware components. The general-purpose processor may be a microprocessor or any conventional processor, etc.

The network end transmitter 530 transmits the connection configuration instruction to the terminal apparatus, to control a radio connection with the terminal apparatus. That is to say, the network end transmitter 530 transmits the connection configuration instruction to the terminal apparatus, and the terminal apparatus sets a radio connection there between based on the connection configuration instruction, so as to communicate with the terminal apparatus. The network end transmitter 530, for example, includes an encoder, an antenna and so on.

The network apparatus 500 further includes other devices such as a memory, an input device, and an output device and so on besides respective devices shown in FIG. 5. Only parts closely related to the embodiment of the present disclosure are described here.

The network apparatus usually allocates the radio resource to the terminal apparatus according to a predetermined rule without considering changes in state of the terminal apparatus itself, after receiving a connection request for requesting a radio resource from the terminal apparatus. Under the predetermined rule, if the network apparatus allocates more radio resources to the terminal apparatus, communication speed between the network apparatus and terminal apparatus can be increased, and delay is reduced, but the terminal apparatus consumes more power; if the network apparatus allocates less radio resources to the terminal apparatus, although quality of communication between the network apparatus and terminal apparatus may be lowered to some degree, power consumption of the terminal apparatus is reduced. For example, in a case that the terminal apparatus is in low power, if the network apparatus controls to be in a state of continuous data transmission with the terminal apparatus, power of the terminal apparatus will be exhausted soon, thus forcing data communication of the terminal apparatus to be ended. In this way, user experience of the terminal apparatus is greatly reduced.

In the technical solution of a network apparatus according to the embodiment of the present disclosure, the network apparatus sets a connection configuration instruction of a radio resource between the network apparatus and the terminal apparatus based on the power supplying state information of the terminal apparatus, and establishes a radio connection according to the connection configuration instruction, which can prolong standby time of the terminal apparatus as much as possible while maintaining a network connection of the terminal apparatus, so that user experience is improved.

Figure 6:
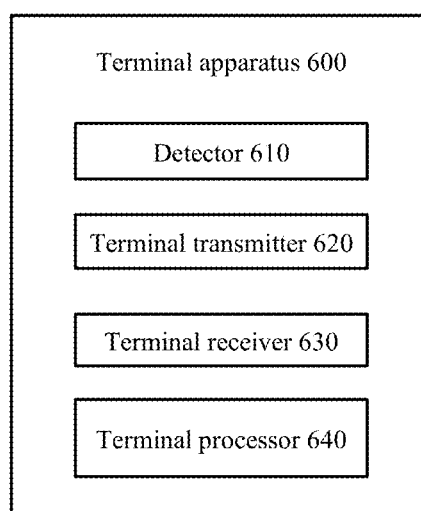
FIG. 6 schematically illustrates a block diagram of a terminal apparatus according to an embodiment of the present disclosure.

FIG. 6 schematically illustrates a block diagram of a terminal apparatus 600 according to the embodiment of the present disclosure. The terminal apparatus 600 corresponds to a mobile phone in FIG. 1.

As shown in FIG. 6, the terminal apparatus 600 may comprise: a detector 610, for detecting power supplying state information of the terminal apparatus; a terminal transmitter 620, for transmitting the power supplying state information of the terminal apparatus to a network apparatus, and sending a connection request for requesting a radio resource to the network apparatus; a terminal receiver 630, for receiving a connection configuration instruction for indicating a connection mode between the network apparatus and the terminal apparatus from the network apparatus, the connection configuration instruction being sent by the network apparatus according to the power supplying state information; and a terminal processor 640, for establishing a radio connection with the network apparatus according to the connection configuration instruction, so as to carry out data transmission through the radio connection.

The detector 610, for example, can acquire the power supplying state information of the terminal apparatus through a power management module of the terminal apparatus. In the terminal apparatus, the power management module is usually used in cooperation with a battery, and the power management module can record information such as source of power supply of the terminal apparatus, power quantity of battery and so on. Therefore, the detector 610 can acquire the power supplying state information of the terminal apparatus by communicating with the power management module. According to different modes of recording power supplying state information in the power management module, the detector can be formed by suitable devices. For example, the detector 610 can be formed by a resistance divider, a data reader and so on.

The terminal transmitter 620 transmits the power supplying state information to the network apparatus. The power supplying state information may be a remaining battery power of the terminal apparatus, may also be a power supply connection state of the terminal apparatus, or may include both of the remaining battery power and the power supply connection state. The power supply connection state, for example, refers to whether the terminal apparatus is powered by a charging supply or a battery, etc. The terminal transmitter 620 may be a wireless transmitter, for example, including an encoder, an antenna and so on.

The terminal transmitter 620 can transmit the power supplying state information to the network apparatus when the power supplying state information meets predetermined conditions. That is to say, not all the power supplying state information is transmitted to the network apparatus, but the power supplying state information is filtered. For example, the power supplying state information is transmitted to the network apparatus when the terminal apparatus needs to save power.

As an example, the terminal processor 640 may determine whether the terminal apparatus is powered by a battery or a charging supply based on the power supplying state information detected by the detector, determine whether a remaining battery power of the terminal apparatus is less than a first predetermined value based on the power supplying state information in a case that the terminal apparatus is powered by the battery, and instruct the terminal transmitter 620 to transmit the detected power supplying state information when the remaining battery power is less than the first predetermined value. At this moment, the power supplying state information may simply be a low power indicator, and the network apparatus sets a connection configuration instruction of the radio resource in a mode of saving a power of the terminal apparatus after receiving the low power indicator. Here, the terminal processor 640 determines whether it is necessary to set a connection configuration instruction of the radio resource in the mode of saving the power of the terminal apparatus, which not only reduces load of the network apparatus, but also reduces an information transmission amount from the terminal apparatus to the network apparatus.

The terminal transmitter 620 can directly transmit the power supplying state information to the network terminal. For example, the terminal transmitter 620 can encapsulate the power supplying state information of the terminal apparatus into a reporting signaling, and transmit the reporting signaling to the network apparatus, the reporting signaling including apparatus capability information related to the terminal apparatus. The power supplying state information of the terminal apparatus is reported to the network apparatus by expanding an existing reporting signaling of the terminal apparatus, which does not change an existing communication mechanism, so that good compatibility is maintained. In addition, the power supplying state information can also be transmitted to a server by the terminal transmitter 620, and then transmitted to the network apparatus by the server. The server, for example, is a special server in an intelligent control system, or a server of an operator, etc. In this case, it is not necessary to expand an air interactive signaling between the terminal apparatus and the base station, i.e., the reporting signaling. A specific transmitting mode of power supplying state information does not constitute a limitation to the embodiments of the present disclosure.

In addition, the terminal transmitter 620 further sends a connection request for requesting a radio resource to the network apparatus. For example, in an LTE communication network, when a terminal apparatus in an RRC idle state needs to communicate with the network apparatus to transmit data, the terminal transmitter 620 sends a connection request to the network apparatus. The terminal transmitter 620 can send the connection request after sending the power supplying state information, can send the connection request before sending the power supplying state information, or can send the power supplying state information and the connection request at the same time. After the network end receiver 510 receives the connection request, the network end processor 520 sets a connection configuration instruction of a radio resource connected with the terminal apparatus based on the power supplying state information, and the network end transmitter 520 controls a radio connection with the terminal apparatus based on the connection configuration instruction.

The terminal receiver 630 receives a connection configuration instruction for indicating a connection mode between the network apparatus and the terminal apparatus from the network apparatus, the connection configuration instruction being sent by the network apparatus according to the power supplying state information. Taking a DRX mode in an LTE communication network for example, the connection configuration instruction, for example, may include one or more of parameters of: "DRX-inactivity timer", "onDuration-Timer", "DRX-Retransmission timer", "HARQ RTT Timer", "shortDRX-Cycle", "drxShortCycleTimer", "longDRX-Cycle", etc. The parameters can make at least one of a disconnecting time and connection state information of the terminal apparatus be set in the mode of saving the power of the terminal apparatus. The disconnecting time, for example, is a predetermined time period from ending data transmission between the terminal apparatus and the network apparatus to disconnecting the radio connection. The connection state information, for example, may include a sleep time and a monitoring time of the terminal apparatus in a connection state between the terminal apparatus and the network apparatus. The terminal receiver 630 is typically a receiver of a radio frequency signal, for example, may include an antenna, a decoder and so on.

The terminal processor 640 establishes a radio connection with the network apparatus according to the connection configuration instruction. For example, the terminal processor 640 can establish a radio connection with the network apparatus according to parameter settings in the DRX mode described above, so as to communicate with the network apparatus in the mode of saving power of the terminal apparatus, or in a non-power saving mode. The terminal processor 640 may be a general-purpose processor, a Digital Signal Processor (DSP), an Application-Specific Integrated Circuit (ASIC), a Field-Programmable Gate Array (FPGA) or other programmable logic devices, discrete gates or transistor logic devices, and discrete hardware components. The general-purpose processor may be a microprocessor or any conventional processor, etc.

The terminal apparatus 600 further includes other devices such as a memory, a monitor and so on besides respective devices shown in FIG. 6. Only parts closely related to the embodiment of the present disclosure are described here.

In technical solutions of a terminal apparatus according to the embodiment of the present disclosure, the terminal apparatus transmits power supplying state information to the network apparatus, and communicates with the network apparatus according to a connection configuration instruction which is set based on the power supplying state information, which can maintain a network connection of the terminal apparatus and prolong standby time of the terminal apparatus as long as possible at the same time, so that user experience is improved.

Those ordinarily skilled in the art may be aware of that, the devices and algorithm steps according to various examples described in conjunction with the embodiments in the present disclosure, may be implemented by electronic hardware, or a combination of computer software and electronic hardware. It depends on constraints to particular applications and design of the technical solution whether these functions are performed in the form of hardware or software. Those skilled in the art can use different methods for the respective particular applications to achieve the described functions, but such implementation shall not be regarded as exceeding the scope of the present disclosure.

Those skilled in the art can clearly understand that, for convenience and conciseness of description, specific working processes of apparatuses and devices described above can refer to corresponding processes in the embodiments of the foregoing method, which will not be described here.

In the several embodiments provided by the present disclosure, it shall be appreciated that the disclosed apparatus and method can be implemented in other manners. For example, the afore-described apparatus embodiments are given by way of illustration only, e.g., the division of the units is only a logic functional division, and may be conducted in other dividing manners in practical implementation, for example, a plurality of units or components can combine or be integrated into another device, or some of the features may be ignored or not performed.

The units illustrated as separating parts may be physically separated or may be not physically separated, and parts displayed as the units may be physical units or may not be physical units. Partial or all units may be selected according to an actual requirement to achieve the purpose of the solution of this embodiment.

The function may be stored in one computer readable storage medium when being implemented in a mode of the software functional unit and being sold or used as an independent product. Based on such understanding, the technical solutions of the present disclosure in essence, or part contributing to the prior art, or part of the technical solutions, may be embodied in the form of a software product, which can be stored in a storage medium, including several instructions to enable a computer device (which may be a personal computer, a server or a network apparatus) to execute the part of or all of steps in the method according to the respective embodiments of the present disclosure. The foregoing storage medium comprises various mediums such as a U disk, a mobile hard disk, a read-only memory, a random access memory, a diskette or a compact disc capable of storing the program codes.

The above are only specific embodiments of the present disclosure, but the scope of the present disclosure is not limited thereto, and any skilled in the art, within the technical scope disclosed by the present disclosure, can easily think of variations or replacements, which should be covered within the protection scope of the present disclosure. Therefore, the scope of the present disclosure should be subject to the scope of the claims.

The invention claimed is:

1. A method for establishing a radio connection comprising:
   detecting a power supplying state information of the terminal apparatus;
   transmitting the power supplying state information of the terminal apparatus to a network apparatus;
   sending a connection request for requesting a radio resource to the network apparatus;
   receiving a connection configuration instruction for indicating a connection mode between the network apparatus and the terminal apparatus from the network apparatus, the connection configuration instruction being sent by the network apparatus according to the power supplying state information; and,
   establishing a radio connection with the network apparatus according to the connection configuration instruction, so as to carry out data transmission through the radio connection,
   wherein the power supplying state information comprises a disconnecting time of a terminal apparatus and wherein the disconnecting time is a predetermined time period from ending data transmission between the terminal apparatus and a network apparatus to disconnecting the radio connection.

2. The method according to claim 1, wherein, the transmitting the power supplying state information of the terminal apparatus to the network apparatus includes:
   packaging the power supplying state information of the terminal apparatus into a reporting signaling that includes apparatus capability information related to the terminal apparatus; and,
   transmitting the reporting signaling to the network apparatus.

3. The method according to claim 1, wherein, the transmitting the power supplying state information of the terminal apparatus to the network apparatus includes:
   determining whether the terminal apparatus is powered by a battery or a charging supply based on the power supplying state information;
   determining whether a remaining battery power of the terminal apparatus is less than a first predetermined value based on the power supplying state information in a case that the terminal apparatus is powered by the battery; and,
   transmitting the detected power supplying state information to the network apparatus when the remaining battery power is less than the first predetermined value.

4. A network apparatus, comprising:
   a network end receiver, for receiving power supplying state information related to a terminal apparatus and receiving a connection request for requesting a radio resource from the terminal apparatus;
   a network end processor, for setting a connection configuration instruction of the radio resource for connecting with the terminal apparatus based on the power supplying state information;
   a network end transmitter, for transmitting the connection configuration instruction to the terminal apparatus, to control a radio connection with the terminal apparatus, the radio connection being used for data transmission between the network apparatus and the terminal apparatus,
   wherein the network end processor sets the connection configuration instruction through operations of setting a connection configuration instruction of the radio resource in a mode of saving a power of the terminal apparatus; and the network end processor sets a disconnecting time in the mode of saving a power of the terminal apparatus, wherein the disconnecting time is a predetermined time period from ending data transmission between the terminal apparatus and the network apparatus to disconnecting the radio connection.

5. The network apparatus according to claim 4, wherein, the network end receiver receives a reporting signaling from the terminal apparatus, and extracts power supplying state information related to the terminal apparatus from the reporting signaling, the reporting signaling including apparatus capability information related to the terminal apparatus, the apparatus capability information including power supplying state information related to the terminal apparatus.

6. The network apparatus according to claim 4, wherein, the network end receiver receives at least one of a remaining battery power and a power supply connection state of the terminal apparatus as the power supplying state information.

7. The network apparatus according to claim 4, wherein, the network end processor sets the connection configuration instruction through operations of:
  determining whether the terminal apparatus is powered by a battery or a charging supply based on the power supplying state information;
  determining whether a remaining battery power of the terminal apparatus is less than a first predetermined value based on the power supplying state information in a case that the terminal apparatus is powered by the battery; and,
  setting the connection configuration instruction of the radio resource in a mode of saving a power of the terminal apparatus when the remaining battery power is less than the first predetermined value.

8. The network apparatus according to claim 7, wherein, the network end processor further sets a connection state information of the terminal apparatus in the mode of saving the power of the terminal apparatus.

9. The network apparatus according to claim 8, wherein, the connection state information includes a sleep time and a monitoring time of the terminal apparatus in a connection state between the terminal apparatus and the network apparatus, and the network end processor sets a connection configuration instruction of the radio resource to reduce the disconnecting time, or sets the connection configuration instruction of the radio resource to increase a ratio of the sleep time to the monitoring time of the terminal apparatus in the connection state, thus saving power consumption of the terminal apparatus.

10. A terminal apparatus, comprising:
  a detector for detecting power supplying state information of the terminal apparatus;
  a terminal transmitter for transmitting the power supplying state information of the terminal apparatus to a network apparatus, and sending a connection request for requesting a radio resource to the network apparatus;
  a terminal receiver for receiving a connection configuration instruction for indicating a connection mode between the network apparatus and the terminal apparatus from the network apparatus, the connection configuration instruction being sent by the network apparatus according to the power supplying state information; and
  a terminal processor for establishing a radio connection with the network apparatus according to the connection configuration instruction, so as to carry out data transmission through the radio connection,
  wherein the power supplying state information comprises a disconnecting time of a terminal apparatus and wherein the disconnecting time is a predetermined time period from ending data transmission between the terminal apparatus and a network apparatus to disconnecting the radio connection.

11. The terminal apparatus according to claim 10, wherein, the terminal transmitter encapsulates the power supplying state information of the terminal apparatus into a reporting signaling, and transmits the reporting signaling to the network apparatus, the reporting signaling including apparatus capability information related to the terminal apparatus.

12. The terminal apparatus according to claim 10, wherein, the terminal processor further determines whether the terminal apparatus is powered by a battery or a charging supply based on power supplying state information detected by the detector, and determines whether a remaining battery power of the terminal apparatus is less than a first predetermined value based on the power supplying state information in a case that the terminal apparatus is powered by the battery, and instructs the terminal transmitter to transmit the detected power supplying state information when the remaining battery power is less than the first predetermined value.

* * * * *